US010114780B2

(12) United States Patent
Sakai

(10) Patent No.: US 10,114,780 B2
(45) Date of Patent: Oct. 30, 2018

(54) INFORMATION PROCESSING APPARATUS THAT PERMITS USE OF A USB DEVICE BY AN APPLICATION BEING DISPLAYED, METHOD OF CONTROLLING THE SAME AND NON-TRANSITORY COMPUTER READABLE MEDIUM

(71) Applicant: CANON KABUSHIKI KAISHA, Tokyo (JP)

(72) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 15/238,077

(22) Filed: Aug. 16, 2016

(65) Prior Publication Data

US 2017/0060798 A1 Mar. 2, 2017

(30) Foreign Application Priority Data

Aug. 31, 2015 (JP) ................................ 2015-171179

(51) Int. Cl.

| | |
|---|---|
| ***G06F 13/38*** | (2006.01) |
| ***G06F 13/42*** | (2006.01) |
| ***G06F 9/44*** | (2018.01) |
| ***G06F 11/30*** | (2006.01) |
| ***G06F 9/4401*** | (2018.01) |
| ***G06F 13/40*** | (2006.01) |
| ***G06F 3/12*** | (2006.01) |

(52) U.S. Cl.

CPC .......... *G06F 13/385* (2013.01); *G06F 3/1201* (2013.01); *G06F 9/4413* (2013.01); *G06F 11/3051* (2013.01); *G06F 13/4081* (2013.01); *G06F 13/4282* (2013.01)

(58) Field of Classification Search

CPC .. G06F 3/1201; G06F 9/4413; G06F 11/3051; G06F 13/385; G06F 13/4081; G06F 13/4282

See application file for complete search history.

(56) References Cited

U.S. PATENT DOCUMENTS

| | | | | |
|---|---|---|---|---|
| 8,285,746 B2 | 10/2012 | Gang et al. | .................. | 707/781 |
| 2010/0178066 A1* | 7/2010 | Asahara | ................ | G06F 3/1203 399/12 |
| 2010/0205327 A1* | 8/2010 | Hamasaki | ............. | H04L 67/125 710/16 |
| 2011/0145815 A1* | 6/2011 | Zou | ...................... | G06F 9/4413 718/1 |

* cited by examiner

*Primary Examiner* — Glenn A. Auve
(74) *Attorney, Agent, or Firm* — Fitzpatrick, Cella, Harper & Scinto

(57) ABSTRACT

An information processing apparatus in which a plurality of applications operate, the apparatus comprising: a detection unit which detects a change, in a display unit, of screens respectively corresponding to the plurality of applications; and a control unit which performs control when, in accordance with a screen of an application displayed in the display unit, the application exclusively uses a USB device USB-connected to the information processing apparatus; wherein if a change of the screen is detected by the detection unit, the control unit performs control so as to forcibly close usage of the USB device by an application for which usage of the USB device is permitted, and permit usage of the USB device to an application corresponding to a screen after the change.

12 Claims, 15 Drawing Sheets

| APPLICATION IDENTIFIER (701) | CONTROL RIGHT (702) | DEVICE CONTROL IDENTIFIER (703) | EVENT LISTENER (704) |
|---|---|---|---|
| 1234-5678-90ab-cdef | 0 | | com.abc.def.EventListener |
| 1111-2222-3333-0000 | 1 | 0x0003, 0x0004 | com.aaa.bbb.UsbEventListener |

| VID | PID |
| --- | --- |
| 0x0000 | 0x2222 |
| 0x1111 | 0x3333 |

INFORMATION PROCESSING APPARATUS THAT PERMITS USE OF A USB DEVICE BY AN APPLICATION BEING DISPLAYED, METHOD OF CONTROLLING THE SAME AND NON-TRANSITORY COMPUTER READABLE MEDIUM

BACKGROUND OF THE INVENTION

Field of the Invention

The present invention relates to an information processing apparatus, a method of controlling the same, and a non-transitory computer readable medium.

Description of the Related Art

Conventionally, an information processing apparatus that can add a function by installing an application is known. A control API (Application Program Interface) for controlling an operation unit or function provided is prepared in such an information processing apparatus, and it is possible to realize various functions by an application using the control API. A USB Host interface is mounted in such an information processing apparatus, and, by calling the USB control API, it is possible to control a USB device connected to the USB Host interface. An IC card reader or a keyboard are raised as examples of a USB device.

For a conventional USB control API, control of a USB device is exclusive, and while an application is controlling a USB device, it is not possible to control the same USB device from another application. Consequently, if there is a desire to control the same USB device from a plurality of applications, there is a necessity to implement such that an application is not in contention with another application for control of the USB device.

For example, a technique that provides a service for managing a transfer of data read from a USB device, wherein an application reads data via the service, is known (for example, the specification of U.S. Pat. No. 8,285,746). By this technique, the service transfers data read from the USB only to an application being displayed on a screen. Therefore, a necessity for the application to be conscious of a display state ceases, and it is possible to realize usage of the same USB device from a plurality of applications by a simpler implementation.

However, to cause the technique of the specification of U.S. Pat. No. 8,285,746 to support an application created by using a conventional USB control API would require modifying the application so as to use the service. Therefore, to cause a plurality of existing applications that perform control of the same USB device to coexist requires changing the implementation of all applications that wish to perform simultaneous use, and there is a problem in that a burden in implementing the applications increases.

SUMMARY OF THE INVENTION

According to one aspect of the present invention, there is provided an information processing apparatus in which a plurality of applications operate, the apparatus comprising: a detection unit configured to detect a change, in a display unit, of screens respectively corresponding to the plurality of applications; and a control unit configured to perform control when, in accordance with a screen of an application displayed in the display unit, the application exclusively uses a USB device USB-connected to the information processing apparatus; wherein if a change of the screen is detected by the detection unit, the control unit performs control so as to forcibly close usage of the USB device by an application for which usage of the USB device is permitted, and permit usage of the USB device to an application corresponding to a screen after the change.

According to another aspect of the present invention, there is provided a method of controlling an information processing apparatus in which a plurality of applications operate, the method comprising: detecting a change, in a display unit, of screens respectively corresponding to the plurality of applications; and controlling when, in accordance with a screen of an application displayed in the display unit, the application exclusively uses a USB device USB-connected to the information processing apparatus; wherein if a change of the screen is detected, controlling so as to forcibly close usage of the USB device by an application for which usage of the USB device is permitted, and permit usage of the USB device to an application corresponding to a screen after the change.

According to another aspect of the present invention, there is provided a non-transitory computer-readable storage medium storing a computer program for causing a computer to function as a detection unit configured to detect a change, in a display unit, of screens respectively corresponding to a plurality of applications; and a control unit configured to perform control when, in accordance with a screen of an application displayed in the display unit, the application exclusively uses a USB device USB-connected to the computer; wherein if a change of the screen is detected by the detection unit, the control unit performs control so as to forcibly close usage of the USB device by an application for which usage of the USB device is permitted, and permit usage of the USB device to an application corresponding to a screen after the change.

By the present application invention, it is possible to cause a plurality of applications that perform control of the same USB device to coexist without altering existing applications.

Further features of the present invention will become apparent from the following description of exemplary embodiments (with reference to the attached drawings).

BRIEF DESCRIPTION OF THE DRAWINGS

FIG. 7 is a view illustrating an example of an application management table held by a USB control library.

FIG. 15 is a view illustrating an example of a list of excepted devices according to a third embodiment.

DESCRIPTION OF THE EMBODIMENTS

Explanation is given in detail below of embodiments of the present invention with reference to the drawings. Note that the following embodiments do not limit the invention according to the scope of the patent claims, and it is not the case that all combinations of features explained in each embodiment are necessary as means for solving the invention.

First Embodiment

Figure 1:
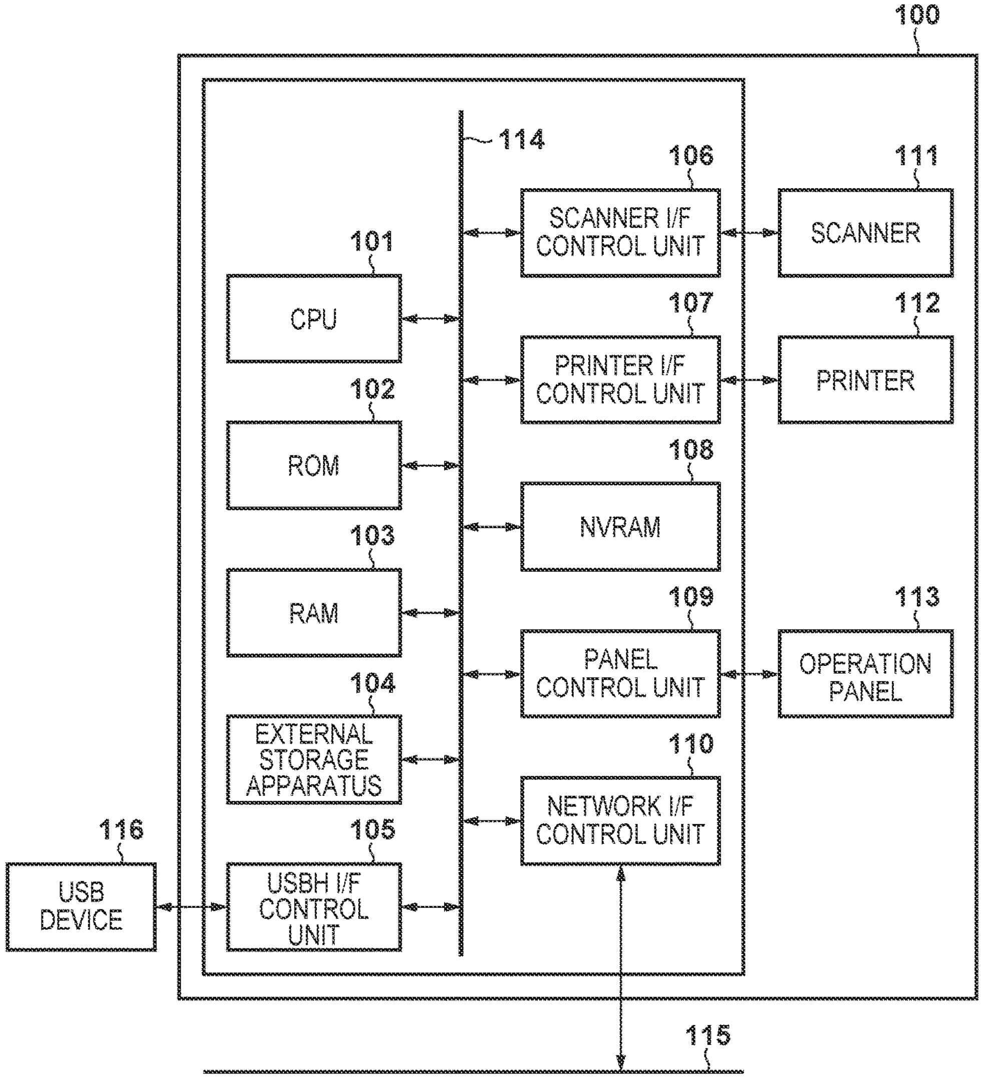
FIG. 1 is a view illustrating an example of a hardware configuration of an information processing apparatus.

FIG. 1 is a block diagram illustrating an example of a hardware configuration of a digital multi-function peripheral as an example of an information processing apparatus to which the present invention is applied. An MFP (Multi-Function Peripheral) or the like is raised as an example of a digital multi-function peripheral.

A CPU 101 executes a software program related to an information processing apparatus 100, and performs control of the information processing apparatus 100 overall. A ROM 102 is a non-volatile storage unit, and stores a boot program of the information processing apparatus 100, fixed parameters, or the like. A RAM 103 is a volatile storage unit, and is used, for example, to store temporary data when the CPU 101 controls the information processing apparatus 100. An external storage apparatus 104 is used to store various data, such as storage of an installed application, data of an application, or print data. A USBH I/F control unit 105 controls a USB Host interface, and controls communication with various USB devices 116. Hereinafter, a USB host is written as a USBH. A scanner I/F control unit 106 controls a scanner 111. A printer I/F control unit 107 controls a printer 112.

An NVRAM 108 is a non-volatile memory, and saves various settings values used in the information processing apparatus 100. By controlling an operation panel 113, a panel control unit 109 performs display of various information, and reception of input of an instruction from a user. A network I/F control unit 110 controls transmission and reception of data with respect to a LAN network 115. The CPU 101, the ROM 102, the RAM 103, the external storage apparatus 104, the USBH I/F control unit 105, the scanner I/F control unit 106, the printer I/F control unit 107, the NVRAM 108, the panel control unit 109, and the network I/F control unit 110 are connected to a bus 114. The bus 114 is a system bus in which data signals between configuration elements and control signals from the CPU 101 are transmitted/received. A USB device 116 is a USB device such as a USB keyboard or an IC card reader, and, in accordance with a request from an application installed in the information processing apparatus 100, is controlled so as to be usable from the application. Note that a version or a standard of USB (Universal Serial Bus) recited in the present specification is not particularly limited, and the present application invention can be applied to any thereof. In addition, one or a plurality of physical USB ports for making a USB connection with the USB device 116 are provided in the information processing apparatus 100 in the present embodiment, and the information processing apparatus 100 can connect to one or a plurality of USB devices. Note that, if a plurality of USB devices are connected to the information processing apparatus, control relating to a control right explained below is performed with respect to each USB device.

Figure 2:
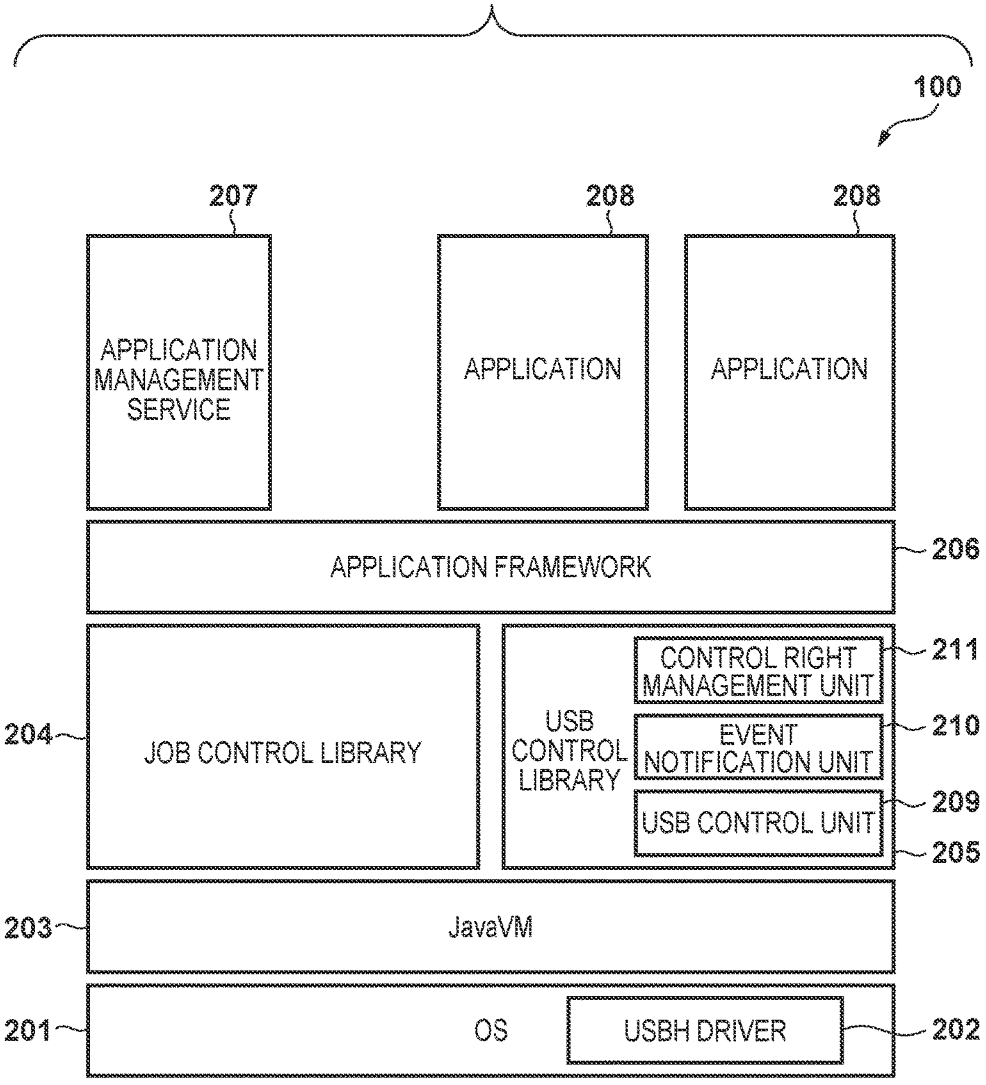
FIG. 2 is a view illustrating an example of a software configuration of an information processing apparatus.

FIG. 2 is a block diagram illustrating an example configuration of software of the information processing apparatus 100 according to embodiments. An OS (Operating System) 201 is base software for causing the software of the information processing apparatus 100 to operate. A USBH driver 202 is a device driver for controlling the USB devices 116 connected to the USBH I/F control unit 105.

A Java VM 203 is a virtual machine for causing a Java program to operate. A job control library 204, a USB control library 205, an application framework 206, an application management service 207, and an application 208 are Java programs described in a Java (registered trademark) language. The Java VM 203 interprets and executes these programs.

The job control library 204 is a library comprising an API (Application Program Interface) for executing a print job or a scan job. The application 208 uses this API when performing control of various jobs. The USB control library 205 is a library provided with various APIs for controlling the USB devices 116 connected to the USBH I/F control unit 105. The USB control library 205 is configured by including a USB control unit 209, an event notification unit 210, and a control right management unit 211. The USB control unit 209 uses the USBH driver 202 to provide an application with functions for controlling the USBH. Specifically, a function for obtaining a list of connected USB devices 116, a function for obtaining information of each connected USB device 116, a function for data transmission/reception, or the like are given. The event notification unit 210 uses a function of the USBH driver 202 to monitor a state of connected USB devices 116, and notifies a change in a number of connections for the USB devices 116 to the application 208. An event notified here is referred to as a "USB device connection number change event" below. By registering in advance an event listener with respect to the USB control library 205, the application 208 can receive a USB device connection number change event. The control right management unit 211 uses an application management table (FIG. 7) to manage, on a per-application basis, a control right (authorization) indicating that usage/control of the USB device 116 is permitted. By setting the control right to an application, the control right management unit 211 changes operations of the event notification unit 210 of the USB control unit 209 with respect to each application.

The application framework 206 is a framework for causing a plurality of applications 208 (Java programs) described by Java (registered trademark) to operate on the Java VM 203. In addition, the application framework 206 performs display control for changing a display screen between applications in a display unit (here, the operation panel 113). Furthermore, the application framework 206 has a function for notifying an application 208 that a displayed application has changed. Furthermore, the application 208 has information such as an application identifier for uniquely identifying each application. Therefore, the application framework 206 and each library can uniquely identify an application based on an application identifier.

The application management service 207 is a service for performing life cycle management of the application 208 that operates on the application framework 206, and controls installation, uninstallation, initiation, and stoppage of the application 208. A user can use a Web browser (not shown) or the like provided by an external apparatus (not shown) to access a UI (User Interface) provided by the application management service 207, and instruct installation, uninstallation, initiation or stoppage of an application. The application 208 controls the scanner 111, the printer 112, the USB device 116, or the like via the job control library 204 or the USB control library 205, and provides various functions to a user.

Figure 3A:
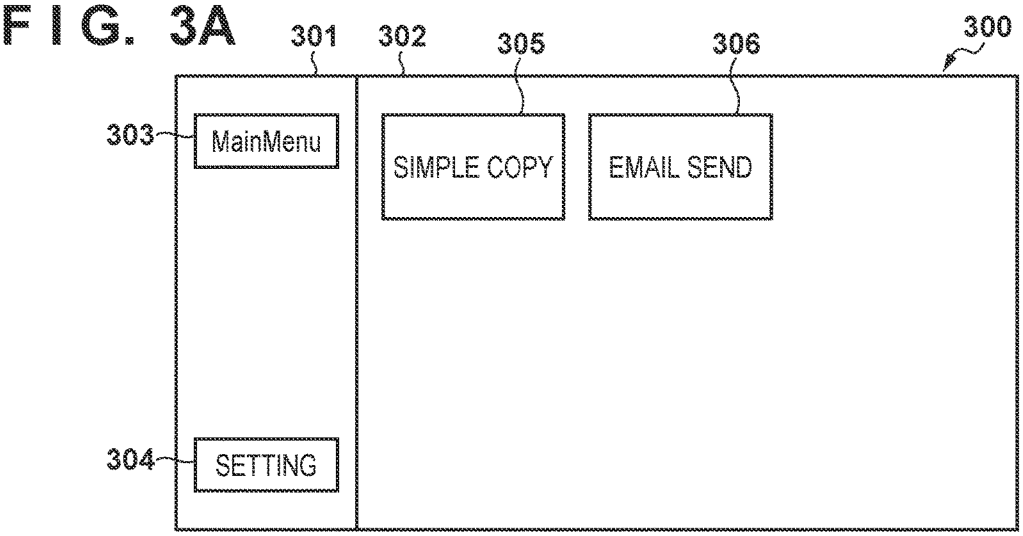
FIGS. 3A, 3B and 3C are views illustrating examples of a UI displayed on an operation panel of the information processing apparatus.
Figure 3B:
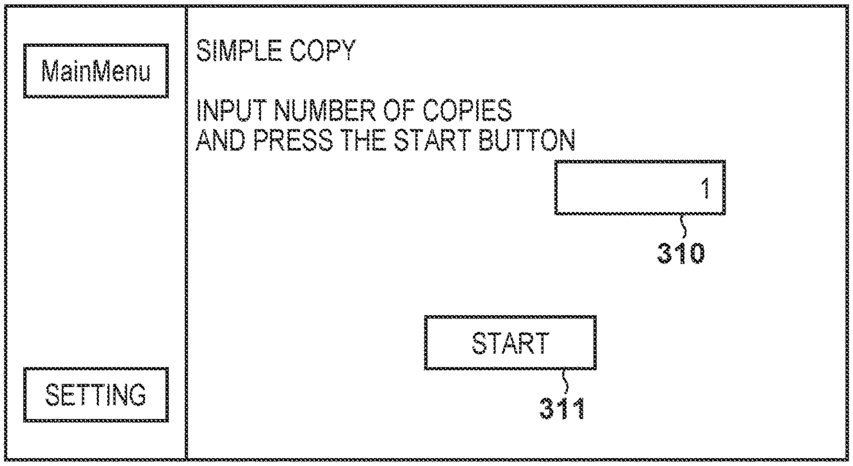
Figure 3C:
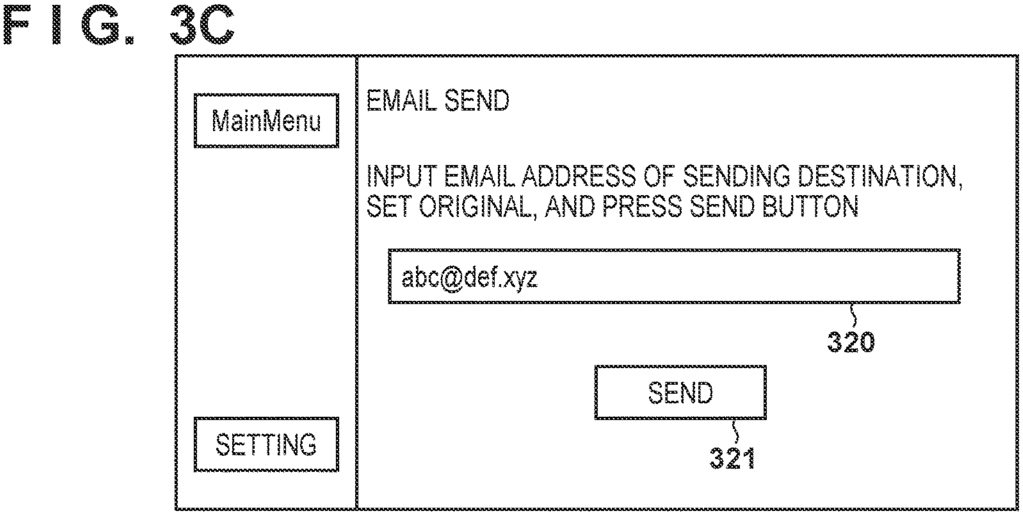

FIGS. 3A to 3C are views illustrating examples of a UI displayed on the operation panel 113 of the information processing apparatus 100. A display area in a UI 300 is divided into a menu button region 301 and an application display region 302. The menu button region 301 is a region in which the same detail is always displayed, and does not depend on an application. The application display region 302 is a region in which an operation screen according to an application is displayed. A main menu button 303 is a button for transitioning to a main menu screen (FIG. 3A). A setting button 304 is a button for transitioning to a setting menu screen (not shown) for changing various settings of the information processing apparatus 100. As an example of a setting in the setting menu screen (not shown), a setting of an IP address for performing network communication, a setting of a mail server used at a time of Email sending, or the like may be raised.

FIG. 3A illustrates a main menu screen that is an example of a screen displayed immediately after starting the information processing apparatus 100. The application display region 302 displays a list of buttons of applications that are installed in the information processing apparatus 100 and can be used. This example displays a simple copy button 305 for transitioning to a "simple copy" application, and an Email send button 306 for transitioning to an "Email send" application. That is, an example in which a "simple copy" application and an "Email send" application are included as applications 208 is illustrated.

FIG. 3B is an example of a "simple copy" application screen displayed when the simple copy button 305 is pressed in the UI 300. This application provides a function for copying an original as is by only a designated number of copies. A number of copies input region 310 is a region for displaying a number of copies that is set. A numeric value input from a numeric keypad or a USB keyboard (in other words, a USB device 116) on the operation panel 113 is displayed. A start button 311 is a button for instructing execution of copy processing. If the start button 311 is pressed, original data read from the scanner 111 is output to paper, in just a designated number of copies, by using the printer 112.

FIG. 3C is an example of an "Email" application screen displayed when the Email send button 306 is pressed in the UI 300. An Email address input region 320 is a UI for inputting an Email address of a sending destination, and it is possible to input by using a USB keyboard (in other words, a USB device 116). If a USB keyboard is not connected, when this region is tapped, a software keyboard (not shown) is displayed, and a user can use the software keyboard to input an Email address. A send button 321 is a button for instructing execution of send processing. If the send button 321 is pressed, data of an original read from the scanner 111 is sent, by having the Email address input in the Email address input region 320 as a destination.

[Processing Flow]

Below, FIG. 4 through FIG. 10 are used to explain a processing flow. All flowcharts explained below are realized by a program for procedures indicated in each flowchart being stored in any storage unit out of the RAM 103, the ROM 102, and the external storage apparatus 104, and being read and executed by the CPU 101.

Figure 4:
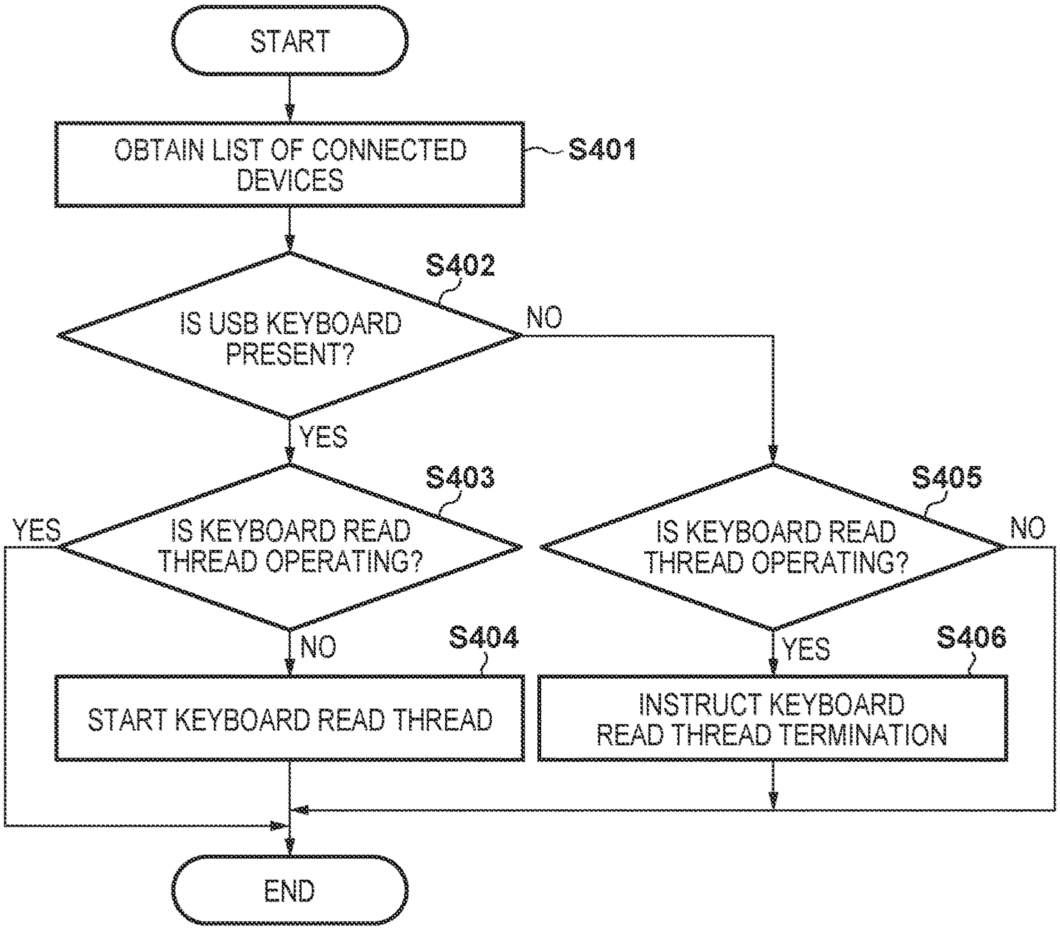
FIG. 4 depicts a flowchart for when a USB device connection number change event is received.

FIG. 4 is a flowchart indicating a flow of processing when the application 208 has received a USB device connection number change event from the USB control library 205. The procedure of the flowchart of FIG. 4 are all executed by an application 208. Note that this application is assumed to be an application for receiving input from the USB keyboard (in other words, a USB device 116). In addition, the application 208 registers in advance an event listener for receiving events in the USB control library 205.

Upon receiving a USB device connection number change event from the USB control library 205, in step S401, the application 208 calls the API of the USB control library 205, and obtains a list of connected devices.

In step S402, the application 208 determines whether the USB keyboard is present, based on whether information of the USB keyboard is included in the list of connected devices obtained in step S401. If it is determined that the USB keyboard is present (YES in step S402), the processing proceeds to step S403, and if it is determined that the USB keyboard is not present (NO in step S402), the processing proceeds to step S405.

In step S403, the application 208 determines whether a USB keyboard read thread, a thread for performing processing for reading a key input from the USB keyboard, is operating. For the USB keyboard read thread, operation is started by performing step S404, which is explained later, and details of processing are explained later by using FIG. 5. If it is determined that the USB keyboard read thread is not operating (NO in step S403), the processing proceeds to step S404, and if it is determined that the USB keyboard read thread is operating (YES in step S403), this processing flow terminates.

In step S404, the application 208 generates the USB keyboard read thread, and starts processing for monitoring input from the USB keyboard. This processing flow is then terminated.

In step S405, the application 208 determines whether the USB keyboard read thread is operating. If it is determined that the USB keyboard read thread is operating (YES in step S405), processing proceeds to step S406, and if not operating is determined (NO in step S405), this processing flow terminates.

In step S406, the application 208 outputs a termination instruction to the USB keyboard read thread for causing the USB keyboard read thread to stop. This processing flow is then terminated.

Figure 5:
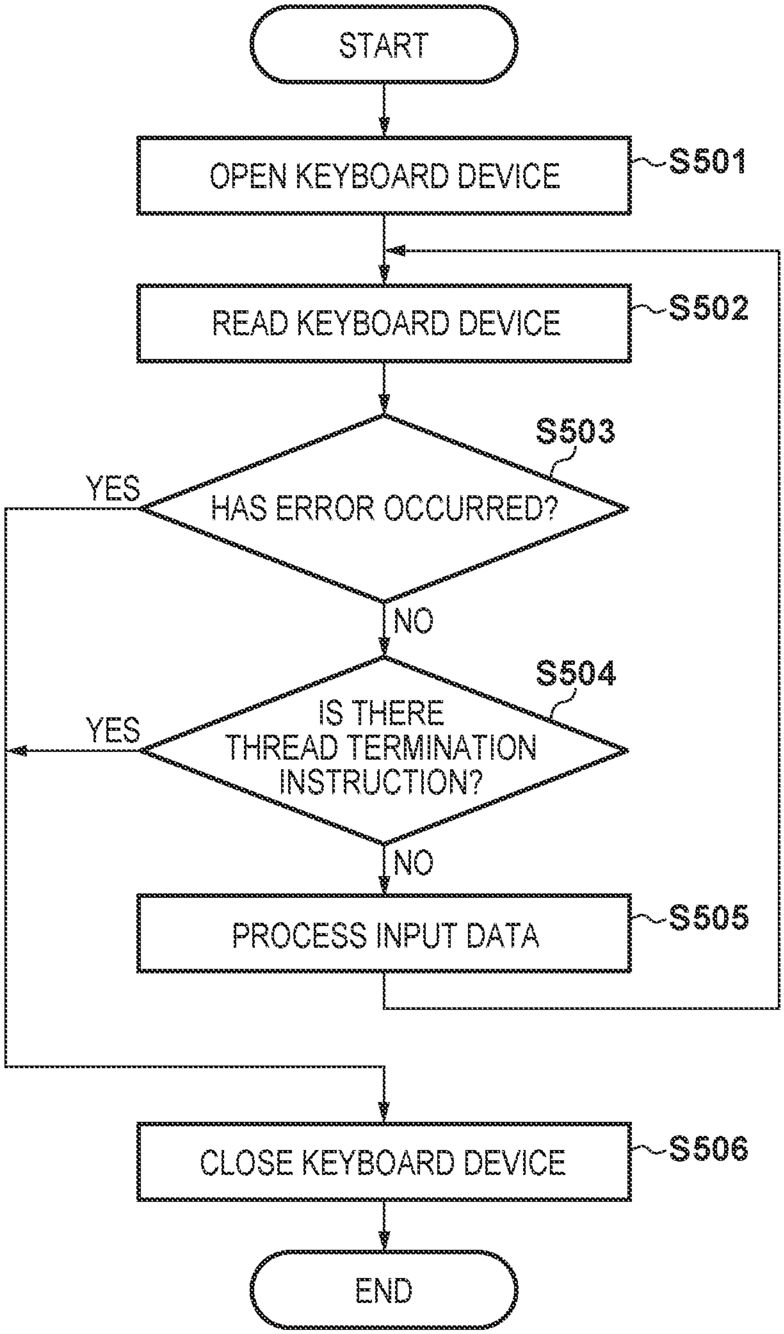
FIG. 5 depicts a flowchart for when reading input from a USB keyboard.

FIG. 5 is a flowchart for illustrating a processing flow when the application 208 reads input data from the USB keyboard. The procedure of the flowchart of FIG. 5 are all executed by an application 208.

In step S501, the application 208 calls the API of the USB control library 205, and opens the USB keyboard, which is present in the list of devices obtained in step S401. At this point, a device control identifier for uniquely identifying USB device control by the USB control unit 209 of the USB control library 205 is generated, and a value thereof is passed to the application 208. In subsequent processing, when controlling the opened USB device, the application 208 calls a respective API of the USB control library 205 by designating the device control identifier accepted at the time of the open. As described above, because control of a USB device is exclusive between applications, if a request to open the same USB device is duplicated from another application, the USB control unit 209 returns an error. Note that, if the open fails and an error is returned, the application 208 waits until it is possible to open the USB device.

In step S502, the application 208 calls the API of the USB control library 205, and reads input data from the opened USB keyboard.

In step S503, the application 208 determines whether an error occurred in the read processing of step S502. As patterns in which errors occur, a case in which the USB keyboard is removed from a USB port, a case in which a USB device is forcibly closed by processing explained later by FIG. 8, or the like may be given. If it is determined that an error has not occurred (NO in step S503), the processing proceeds to step S504, and if it is determined that an error occurred (YES in step S503), the processing proceeds to step S506.

In step S504, the application 208 determines whether a thread termination instruction has been received. Specifically, if the processing of step S406 of FIG. 4 is executed, it is determined that the thread termination instruction has been received, and if the processing of step S406 is not executed, it is determined that the thread termination instruction has not been received. If it is determined that the thread termination instruction has been received (YES in step S504), step S506 is proceeded to, and if it is determined that the thread termination instruction has not been received (NO in step S504), step S505 is proceeded to.

In step S505, the application 208 processes the data read in step S502. In the case of the "Email send" application illustrated in FIG. 3C, for example, an input character sequence is displayed in the Email address input region 320. Thereafter, step S502 is returned to, and the application 208 repeats the processing.

In step S506, the application 208 calls the API of the USB control library 205, and closes the USB keyboard opened in step S501. This processing flow is then terminated. Note that, after the completion of the closing processing, it becomes possible to open the same USB keyboard device again from another application or the like. Accordingly, if an error is returned in step S501, after another application performs the processing of step S506, it becomes possible to open the same USB device.

Figure 6:
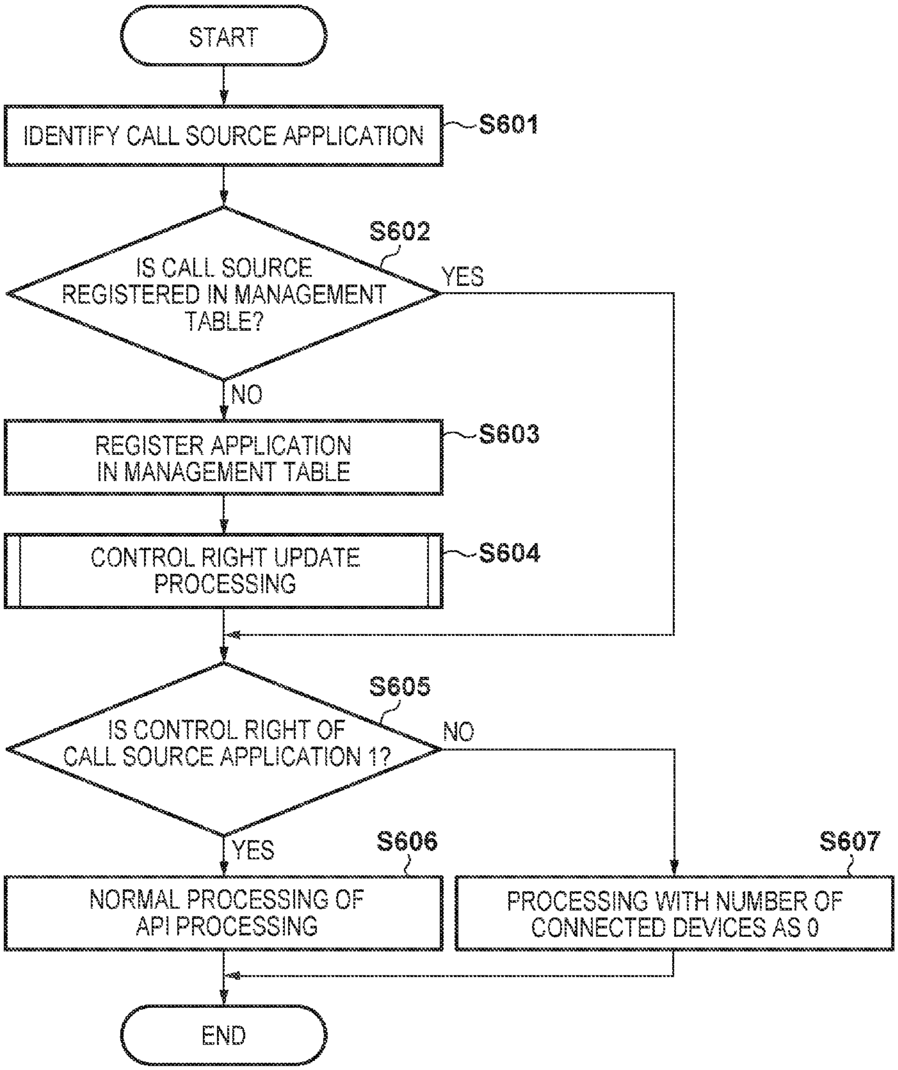
FIG. 6 depicts a flowchart for when a USB control library according to the first embodiment is called.

FIG. 6 is a flowchart for illustrating a flow of processing of each API of the USB control library 205 for when an API of the USB control library 205 is called from the application 208. Each procedure of the flowchart of FIG. 6 is executed inside the USB control library 205.

Upon receiving an API call from the application 208, in step S601, the control right management unit 211 in the USB control library 205 identifies the application identifier of the application that is the call source.

In step S602, the control right management unit 211 determines whether the application identifier of the call source application is registered in an application management table (FIG. 7) that the USB control library 205 is holding.

FIG. 7 illustrates an example of an application management table 700. The application management table 700 is a table for the USB control library 205 to manage information regarding applications that are call sources. In the application management table 700, an application identifier 701, a control right 702, a device control identifier 703, and an event listener 704 are managed in association. The application identifier 701 is an identifier for uniquely identifying an application. The control right 702 is a flag for indicating whether the application is permitted to control a USB device. In the control right 702, "0" is set if there is no permission to control a USB device, and "1" is set if permitted to control a USB device. In following explanations, the case in which the control right is "0" is expressed as "not having a control right", and the case in which the control right is "1" is expressed as "having a control right". The device control identifier 703 is an identifier for uniquely identifying USB control by the application, and stores a device control identifier generated by the USB control unit 209 when the application opens a USB device. The event listener 704 is an event listener for notifying an event to the application 208, and stores an event listener registered from each application via the API of the USB control library 205.

If it is determined that the call source application is not registered in the application management table 700 (NO in step S602), the processing proceeds to step S603, and if it is determined that it is registered (YES in step S602), the processing proceeds to step S605.

In step S603, the control right management unit 211 registers in the application management table 700 the application identifier of the application that was obtained in step S601. At this point, for the registered application, registration is performed by having a state in which the control right is not held (in other words, is set to "0") and a state in which the device control identifier is blank as initial values.

In step S604, the control right management unit 211 performs processing for updating information of the control right 702 in the application management table 700 in accordance with a display state of the application. Detail of this processing is explained later by using the flowchart of FIG. 8. After this processing, the processing proceeds to step S605.

In step S605, the control right management unit 211 determines whether the call source application has a control right. If having a control right is determined (YES in step S605), the processing proceeds to step S606, and if not having a control right is determined (NO in step S605), the processing proceeds to step S607.

In step S606, the control right management unit 211 executes the called API processing normally. This processing flow is then terminated. Here "execute . . . normally" indicates processing is performed with respect to a physically connected USB device, without adding anything, such as a setting change or the like. For example, if the API processing is execution of a connected devices list obtainment API, a list of information of connected USB devices is returned to the call source application as is.

In step S607, the USB control unit 209 executes API processing by treating the number of connected devices as "0". For example, if the API processing is execution of the connected devices list obtainment API, blank information is returned to the application. The blank information here indicates that there are no connected USB devices. In other words, if the call source application does not have a control right for a USB device, even if the USB device is physically connected to the information processing apparatus 100, the USB control unit 209 responds that it is not connected to the call source. This processing flow is then terminated.

Figure 8:
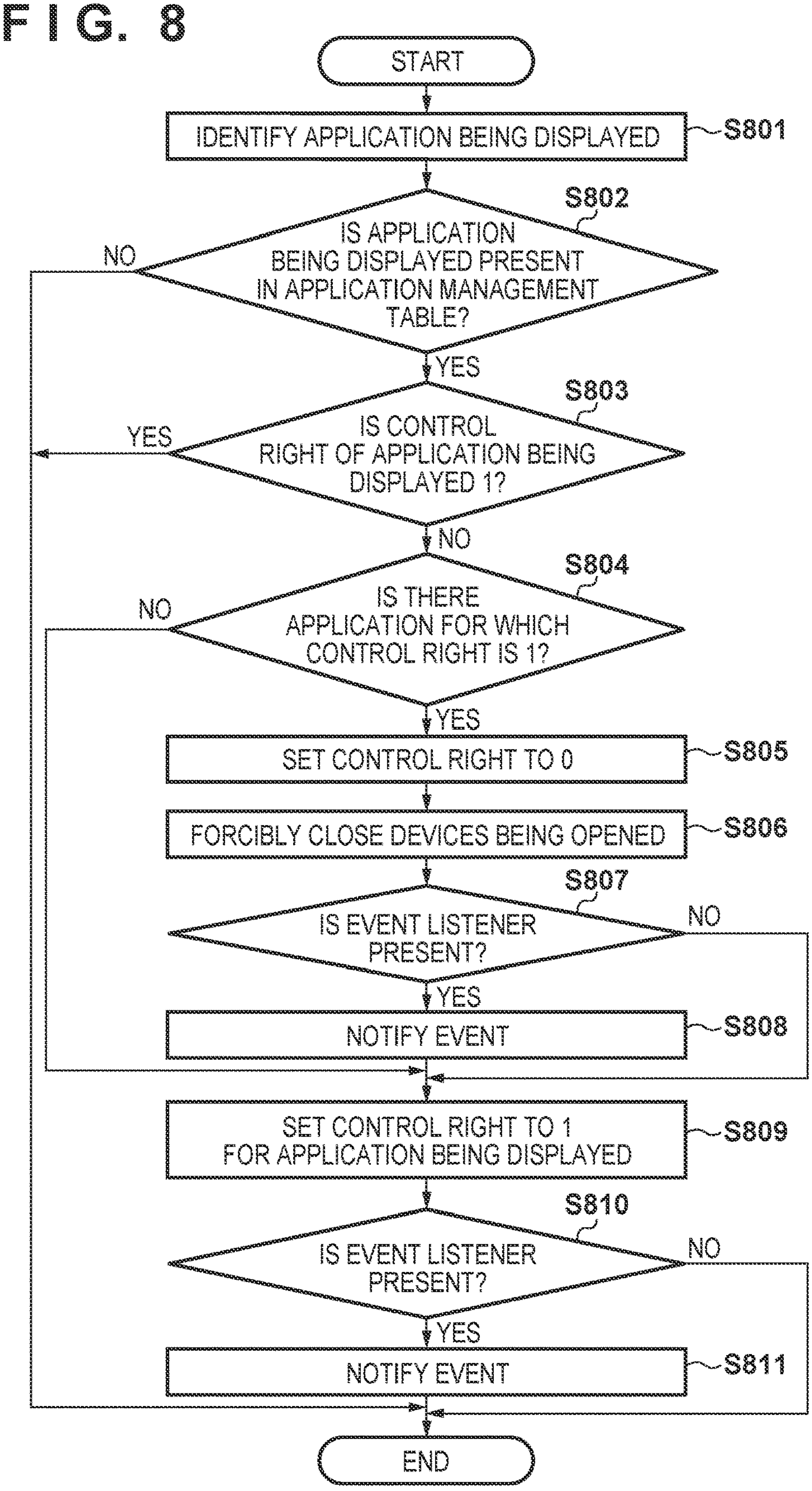
FIG. 8 depicts a flowchart of a process for updating the application management table according to the first embodiment.

FIG. 8 is a flowchart for illustrating a flow of processing when control right information of the application management table 700 is updated. This processing corresponds to step S604 of FIG. 6 or step S903 of FIG. 9, which is explained later. Each procedure of the flowchart of FIG. 8 is executed inside the USB control library 205.

In step S801, the control right management unit 211 identifies the application identifier of the application being displayed in the operation panel 113. The application displayed here indicates the application for which a corresponding screen is displayed in the operation panel 113, as illustrated in FIG. 3B and FIG. 3C, for example.

In step S802, the control right management unit 211 determines whether the application identifier of the application that was identified in step S801 is included in the application management table 700. If not included is determined (NO in step S802), this processing flow terminates without updating the application management table 700. If included in the application management table 700 is determined (YES in step S802), the processing proceeds to step S803.

In step S803, the control right management unit 211 determines whether the application identified in step S801 has a control right. If having a control right is determined (YES in step S803), this processing flow terminates without updating the application management table 700. If it is determined that the application identified in step S801 does not have a control right (NO in step S803), the processing proceeds to step S804.

In step S804, the control right management unit 211 determines whether an application having a control right is present in the application management table 700. If it is determined that an application having a control right is not present (NO in step S804), the processing proceeds to step S809, and if it is determined that an application having a control right is present (YES in step S804), the processing proceeds to step S805.

In step S805, the control right management unit 211 disables the control right of the application determined to have the control right in step S804. In other words, the control right management unit 211 changes to "0" the value of the control right 702 of the application, in the application management table 700.

In step S806, the control right management unit 211 forcibly closes all USB devices that the application determined in step S804 is controlling. At this point, the control right management unit 211 identifies devices to close based on device control identifiers in the application management table 700.

In step S807, the event notification unit 210 refers to the application management table 700 to determine whether an event listener for the application determined in step S804 is present. If it is determined that an event listener is not present (NO in step S807), the processing proceeds to step S809, and if it is determined that an event listener is present (YES in step S807), the processing proceeds to step S808.

In step S808, the event notification unit 210 notifies a USB device connection number change event to the application determined in step S804. Thereafter, the processing proceeds to step S809.

In step S809, the control right management unit 211 adds a control right to the application identified as being displayed in step S801. In other words, the control right management unit 211 changes to "1" the value of the control right 702 of the application, in the application management table 700.

In step S810, the event notification unit 210 refers to the application management table 700 to determine whether an event listener for the application identified in step S801 is present. If it is determined that an event listener is not present (NO in step S810), this processing flow terminates, and if it is determined that an event listener is present (YES in step S810) the processing proceeds to step S811.

In step S811, the event notification unit 210 notifies a USB device connection number change event to the event listener of the application identified in step S801. This processing flow is then terminated.

By the above control, it is possible to perform control to make an application that lost a control right (in other words, an application for which the value of a control right has been changed from "1" to "0") enter a state that is the same as a case in which a USB device has been detached. In addition, it is possible to perform control to make an application that acquired a control right (in other words, an application for which the value of a control right has been changed from "0" to "1") enter a state that is the same as when a USB device is newly connected.

Figure 9:
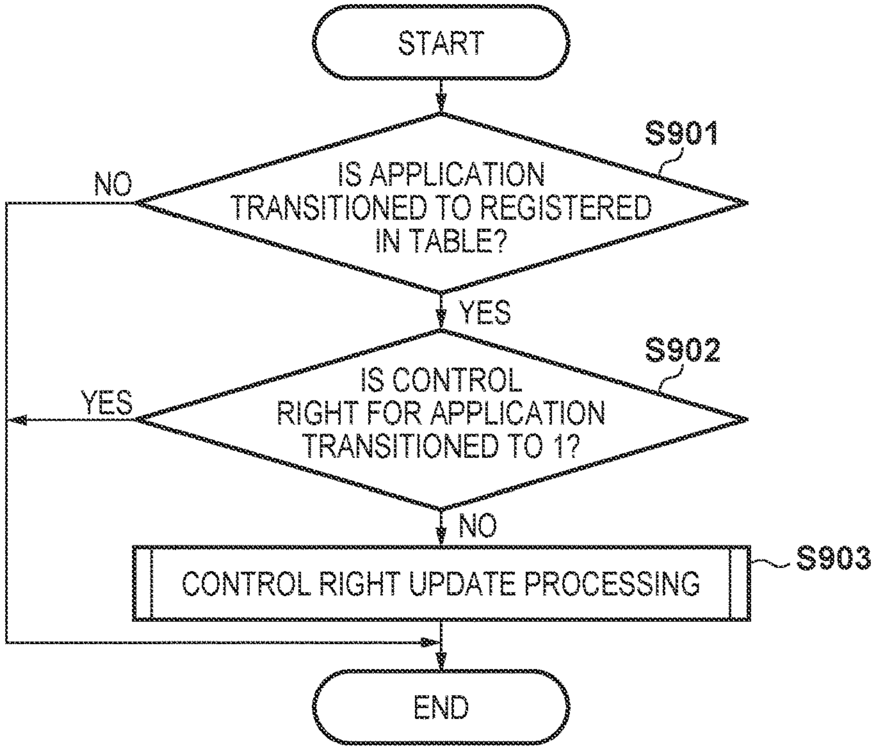
FIG. 9 depicts a flowchart for a time of changing an application according to the first embodiment.

FIG. 9 is a flowchart illustrating a processing flow when the USB control library 205 has detected a change of an application. Each procedure of the flowchart of FIG. 9 is executed by the control right management unit 211 inside the USB control library 205. Note that detection of a change of an application is performed via the application framework 206. Note that, in the present embodiment, for a change of an application, for example a case in which a screen displayed in the operation panel 113 changes to a screen of another application is envisioned.

Upon detecting a change of an application, in step S901, the control right management unit 211 determines whether an application identifier of the application that was changed to is registered in the application management table 700. If not registered is determined (NO in step S901), this processing flow terminates, and if registered is determined (YES in step S901) the processing proceeds to step S902.

In step S902, the control right management unit 211 refers to the application management table 700 to determine whether the application changed to has a control right. If having a control right is determined (YES in step S902), this processing flow terminates, and if not having a control right is determined (NO in step S902), the processing proceeds to step S903.

In step S903, the control right management unit 211 executes the control right update processing explained by FIG. 8. This processing flow is then terminated.

Figure 10:
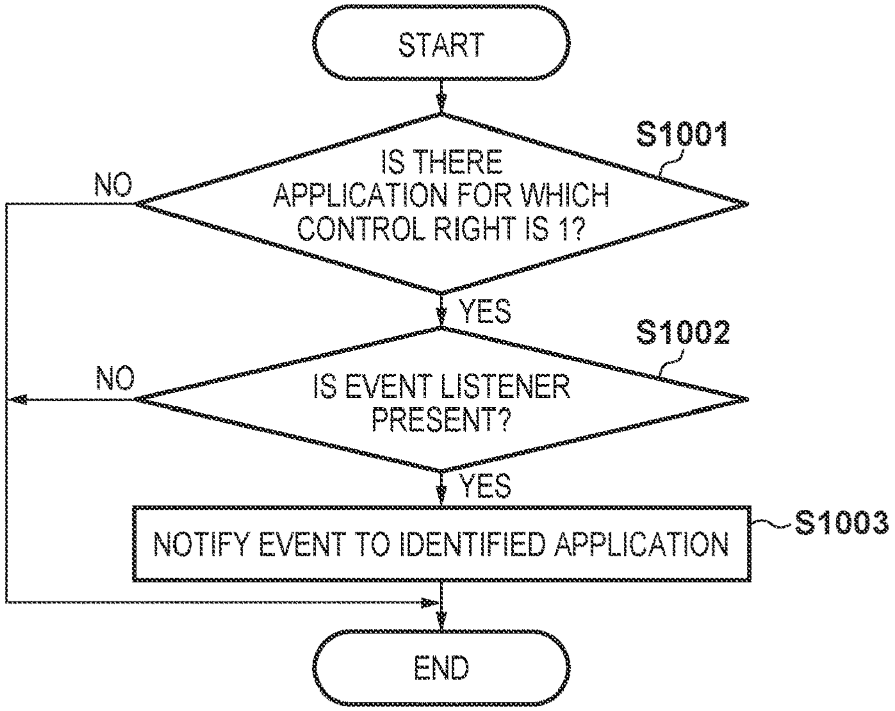
FIG. 10 depicts a flowchart for when there is a change of a number of connected USB devices according to the first embodiment.

FIG. 10 is a flowchart illustrating a processing flow when the USB control library 205 has detected a connection or removal of a USB device 116. Each procedure of the flowchart of FIG. 10 is executed by the event notification unit 210 inside the USB control library 205.

Upon detection of connection or removal of a USB device, in step S1001, the event notification unit 210 refers to the application management table 700 to determine whether an application having a control right is present. If it is determined that an application having a control right is not present (NO in step S1001), this processing flow terminates, and if it is determined that an application having a control right is present (YES in step S1001), the processing proceeds to step S1002.

In step S1002, the event notification unit 210 refers to the application management table 700 to determine whether an event listener for the application that has a control right is present. If it is determined that an event listener is not present (NO in step S1002), processing terminates, and if it is determined that an event listener is present (YES in step S1002) the processing proceeds to step S1003.

In step S1003, the event notification unit 210 notifies a USB device connection number change event to the event listener of the application that has a control right. This processing flow is then terminated.

Therefore, in the present embodiment, the control right of the application that controls a USB device is managed to only allow the application having the control right to control the USB device. In addition, in the present embodiment a number of connected devices is made to appear to be 0 to an application with no control right. By this, to an application that has acquired a control right a USB device is made to appear to have been newly connected. In contrast, for an application having lost a control right it is made to appear as though all USB devices have been removed (that is, that USB connections have been released). Therefore, even if an application is of a specification in which it monopolizes a USB device and does not release it, it is possible to cause a plurality of applications that use the USB device to coexist without altering the application.

Second Embodiment

Next, explanation is given regarding a second embodiment of the present invention. The first embodiment is a configuration in which an update of a control right is performed in response to a change of an application that uses a USB device, and it is possible for an application displayed in an operation unit to preferentially control a USB device. In the second embodiment, consideration is also given to a case of desiring to allow an application that first opens a USB device to monopolize the USB device. Note that, explanation is given below regarding only points that differ to the first embodiment, and other points are assumed to be similar to as in the first embodiment.

Figure 11:
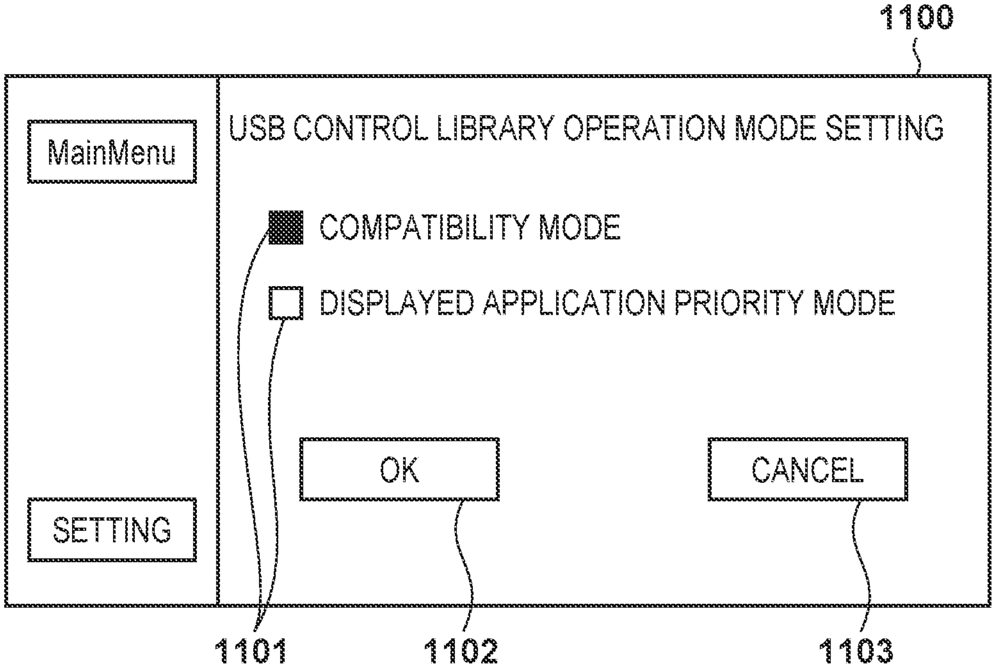
FIG. 11 is a view illustrating an example of a setting screen for an operation mode according to the second embodiment.

FIG. 11 illustrates an example of a setting screen 1100 of the information processing apparatus 100, according to the second embodiment. The setting screen 1100 is a setting screen for changing an operation mode of the USB control library 205. The setting screen 1100 can be transitioned to from the setting menu screen (not shown) displayed when the setting button 304 of FIG. 3A is pressed.

A radio button 1101 is a button for selecting an operation mode of the USB control library 205. In the present embodiment, there are two types of operation modes: a "compatibility mode" and a "displayed application priority mode". The compatibility mode is an operation mode in which, if the application 208 does not explicitly close a USB device 116, the same USB device 116 cannot be controlled from another application, and is a mode for causing compatible operation with devices of the past. In other words, in the compatibility mode, processing according to embodiments stated in the first embodiment is not performed. In contrast, a displayed application priority mode is an operation mode in which operations explained in the first embodiment are performed. A cancel button 1103 is a button for returning to the setting menu screen (not shown) without changing the operation mode setting. An OK button 1102 is a button changing settings an operation mode selected by the radio button 1101. Information of an operation mode set here is saved in the NVRAM 108. Note that, even if the OK button 1102 is pressed, it is assumed that operation is not immediately reflected by just changing the display on the operation panel 113, but that actual operation is changed after a restart of the information processing apparatus 100.

[Process Flow]

Figure 12:
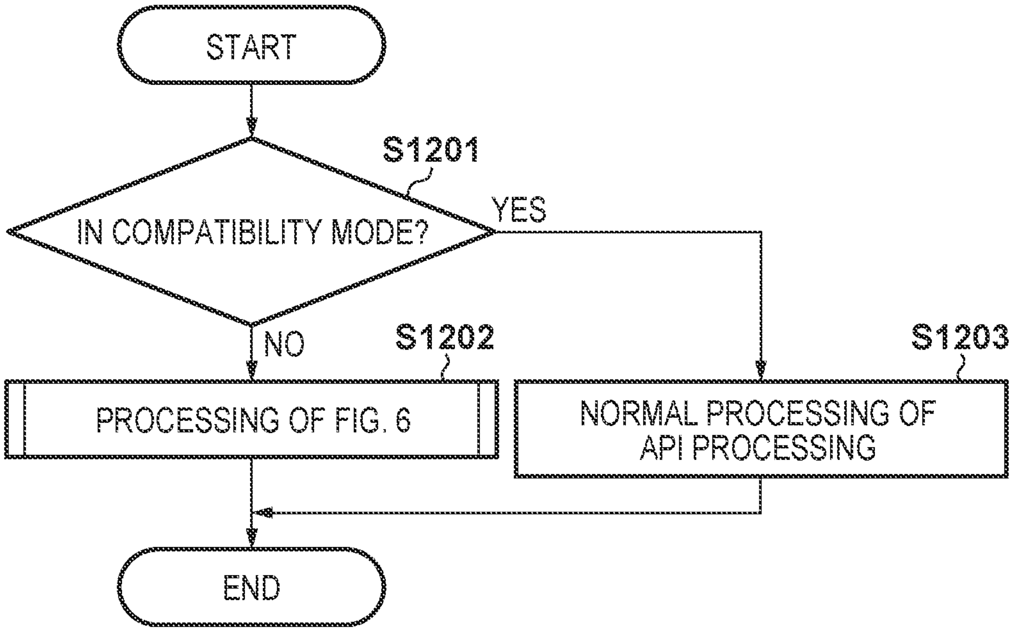
FIG. 12 depicts a flowchart for when a USB control library according to a second embodiment is called.

FIG. 12 is a flowchart for illustrating a flow of processing of each API of the USB control library 205 for when an API of the USB control library 205 is called from the application 208. Each procedure of the flowchart of FIG. 12 is executed inside the USB control library 205.

Upon receiving an API call from the application 208, in step S1201, the USB control library 205 refers to information saved in the NVRAM 108 to determine whether the operation mode of the USB control library 205 is the compatibility mode. If it is determined that the operation mode of the USB control library 205 is not the compatibility mode (NO in step S1201), the processing proceeds to step S1202, and if it is determined to be the compatibility mode (YES in step S1201), the processing proceeds to step S1203.

In step S1202, the control right management unit 211 executes processing of the flowchart explained by FIG. 6. This processing flow is then terminated.

In step S1203, the USB control unit 209 executes API processing normally. Processing here is processing similar to step S606 of FIG. 6. This processing flow is then terminated.

Figure 13:
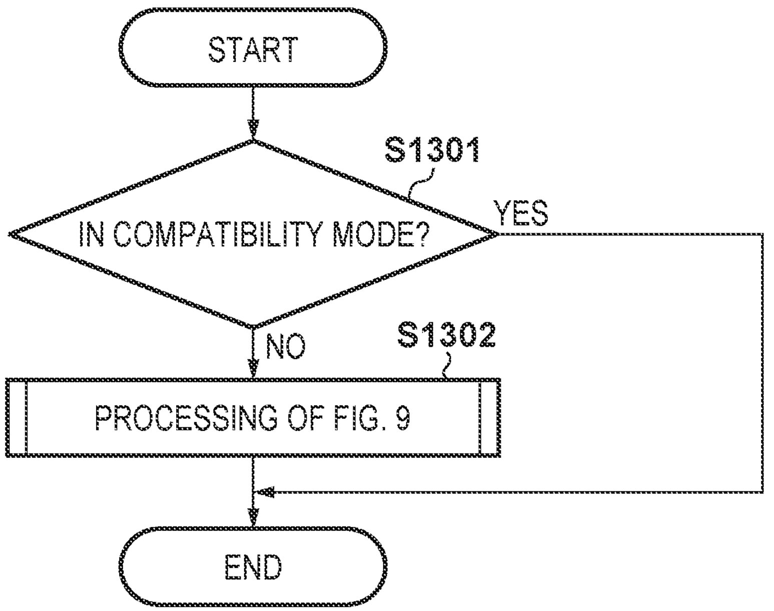
FIG. 13 depicts a flowchart for a time of changing an application according to the second embodiment.

FIG. 13 is a flowchart illustrating a processing flow when the USB control library 205 has detected a change of an application 208. Each procedure of the flowchart of FIG. 13 is executed by the control right management unit 211 inside the USB control library 205.

Upon detecting a change of the application 208, in step S1301, the control right management unit 211 refers to the information saved in the NVRAM 108 to determine whether the operation mode of the USB control library 205 is the compatibility mode. If it is determined that the operation mode is not the compatibility mode (NO in step S1301), the processing proceeds to step S1302, and if it is determined to be the compatibility mode (YES in step S1301), this processing flow terminates.

In step S1302, the control right management unit 211 executes processing of the flowchart explained by FIG. 9. This processing flow is then terminated.

Figure 14:
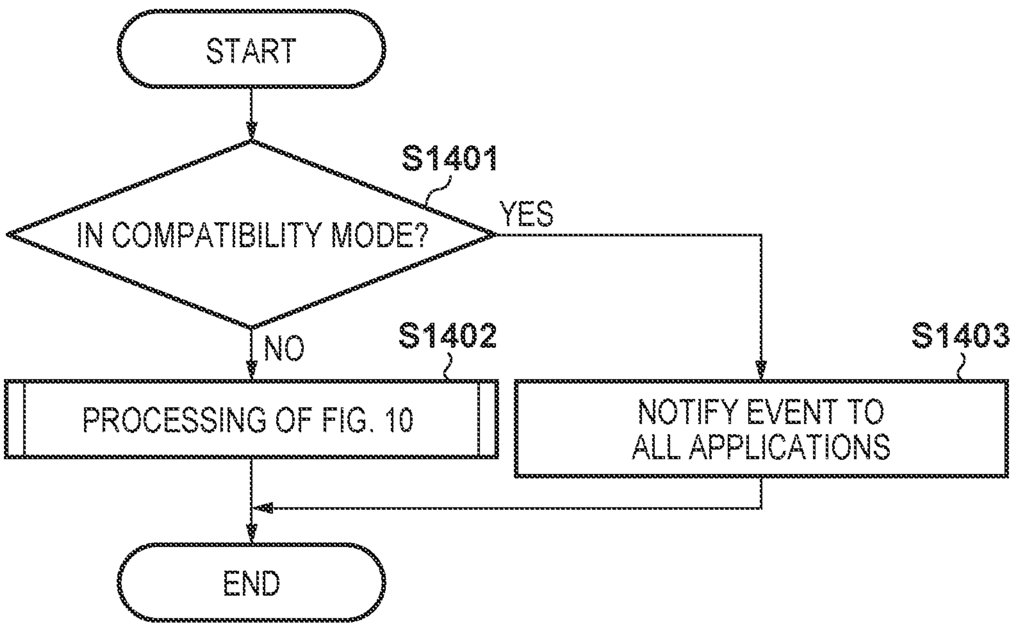
FIG. 14 depicts a flowchart for when there is a change of a number of connected USB devices according to the second embodiment.

FIG. 14 is a flowchart illustrating a processing flow when the USB control library 205 has detected a connection or removal of a USB device. Each procedure of the flowchart of FIG. 14 is executed by the event notification unit 210 inside the USB control library 205.

Upon detecting a connection or a removal of a USB device, in step S1401, the event notification unit 210 refers to the information saved in the NVRAM 108 to determine whether the operation mode of the USB control library 205 is the compatibility mode. If it is determined that the operation mode is not the compatibility mode (NO in step S1401), the processing proceeds to step S1402, and if it is determined to be the compatibility mode (YES in step S1401), the processing proceeds to step S1403.

In step S1402, the event notification unit 210 executes processing of the flowchart explained by FIG. 10. This processing flow is then terminated.

In step S1403, the event notification unit 210 notifies a USB device connection number change event to all event listeners registered in the application management table 700. This processing flow is then terminated.

Therefore, in the present embodiment, configuration is taken such that operation is changed by making it possible for a user to set the operation mode of the USB control library 205. Because of this, by changing an operation mode, it is possible to support even cases in which a situation of desiring to cause a USB device to be monopolized by an application occurs.

Third Embodiment

Next, explanation is given regarding a third embodiment of the present invention. In the third embodiment, consideration is also given to a case, for a particular USB device, in which it is desired that an application that first opens the USB device is to monopolize the USB device. Note that, explanation is given below regarding only points that differ to the first embodiment, and other points are assumed to be similar to as in the first embodiment.

In the third embodiment, to support a situation of desiring to cause a particular device to be monopolized by an application, the USB control library 205 holds a list of excepted devices. Here, an excepted device indicates, out of USB devices connected to the information processing apparatus 100, a USB device that is a non-target of control to change the control right of each application accompanying change of a screen display according to the present application invention.

FIG. 15 illustrates an example of a list of excepted devices 1500 according to the present embodiment. The list of excepted devices 1500 is configured from pairs of a VID 1501 and a PID 1502. The VID 1501 is a vendor ID, and is an identifier for uniquely identifying a vendor of a USB device. The PID 1502 is a product ID, and is an identifier for uniquely identifying a products for each vendor. These IDs are saved inside the USB device. Various software modules can perform model discrimination of a USB device by reading this information from the USB device. Note that, in the third embodiment, the list of excepted devices 1500 is assumed to be embedded in the USB control library 205 in advance.

[Process Flow]

Figure 16:
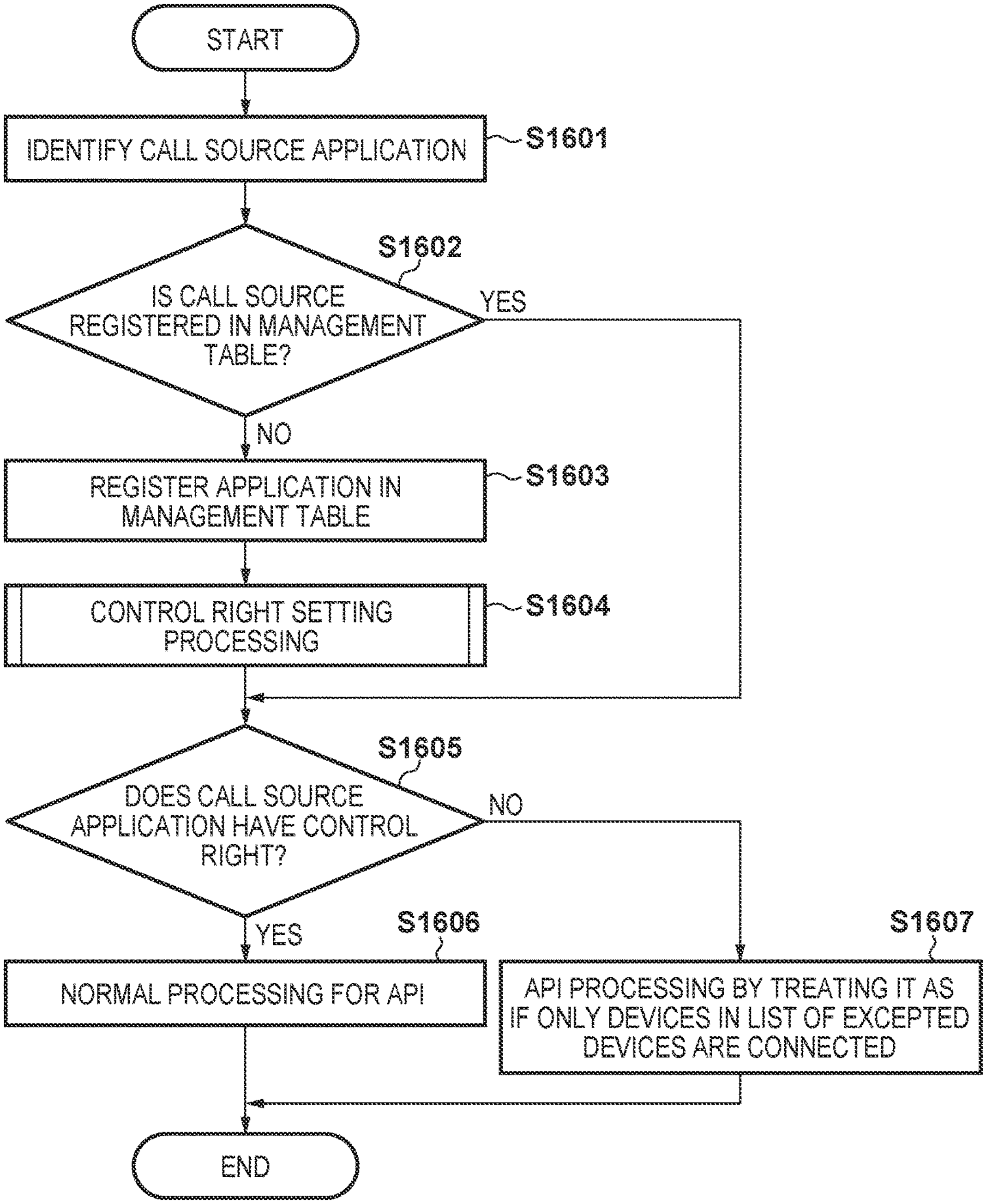
FIG. 16 depicts a flowchart for when a USB control library according to the third embodiment is called.

FIG. 16 is a flowchart for illustrating a flow of processing of each API of the USB control library for when an API of the USB control library 205 is called from the application 208. Each procedure of the flowchart of FIG. 16 is executed inside the USB control library 205.

Upon receiving an API call from the application 208, in step S1601, the control right management unit 211 identifies the application identifier of the application that is the call source.

In step S1602, the control right management unit 211 determines whether the call source application is registered in the application management table 700 that the USB control library 205 is holding. If it is determined that the call source application is not registered in the application management table 700 (NO in step S1602), the processing proceeds to step S1603, and if it is determined that it is registered (YES in step S1602), the processing proceeds to step S1605.

In step S1603, the control right management unit 211 registers in the application management table 700 the application identifier of the application identified in step S1601. At this point, for the registered application, registration is performed by having a state in which the control right is not held (in other words, is set to "0") and a state in which the device control identifier is blank as initial values.

In step S1604, the control right management unit 211 updates the value of the control right 702 in the application management table 700 in accordance with the situation. Detail of this processing is explained later using FIG. 17. After this processing, the processing proceeds to step S1605.

In step S1605, the control right management unit 211 refers to the application management table 700 to determine whether the call source application has a control right. If it is determined that the call source application has a control right (YES in step S1605), the processing proceeds to step S1606, and if it determined not to have a control right (NO in step S1605), the processing proceeds to step S1607.

In step S1606, the USB control unit 209 executes the called API processing normally. Processing here is processing similar to step S606 of FIG. 6. This processing flow is then terminated.

In step S1607, the USB control unit 209 executes API processing by treating it as if it were a state in which only the USB device registered in the list of excepted devices 1500 was connected. For example, in a case in which API processing is execution of the connected devices list obtainment API, if USB devices are registered in the list of excepted devices 1500 a list of information of registered USB devices is returned, and if no USB devices are registered blank information is returned to an application. The blank information here indicates that there are no connected USB devices. In other words, if the call source application does not have a control right for a USB device, the USB control unit 209 responds to the call source with only information of a USB device physically connected to the information processing apparatus 100 and is registered in the list of excepted devices 1500. This processing flow is then terminated.

Figure 17:
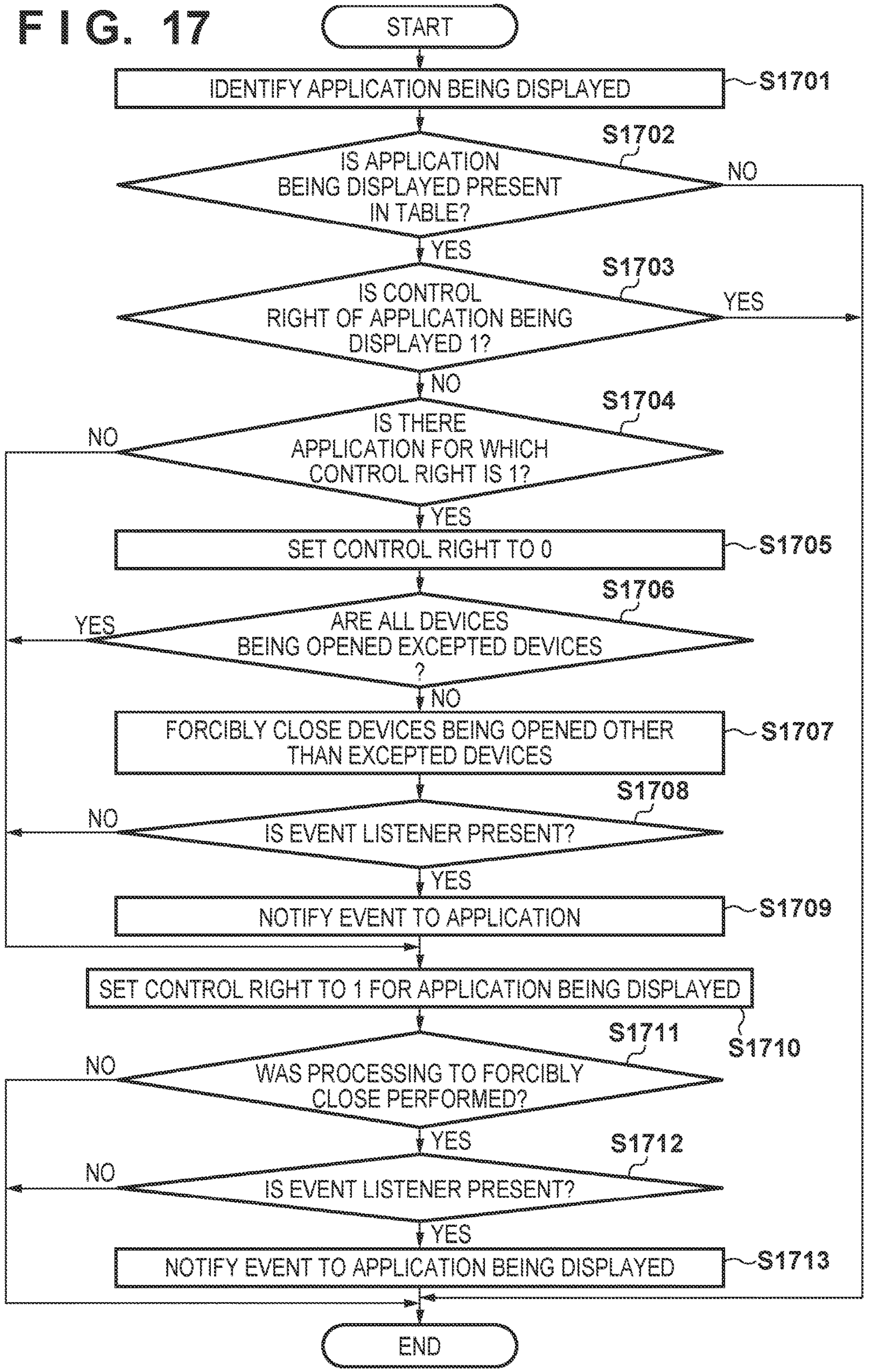
FIG. 17 depicts a flowchart of a process for updating the application management table according to the third embodiment.

In the third embodiment, processing for when the USB control library 205 detects a change of an application becomes, out of processing of FIG. 9 explained in the first embodiment, processing in which the control right update processing of step S903 is illustrated by FIG. 17. Other processing is the same.

FIG. 17 is a flowchart for illustrating a flow of processing when control right information of the application management table 700 in the third embodiment is updated. Each procedure of the flowchart of FIG. 17 is executed inside the USB control library 205.

In step S1701, the control right management unit 211 identifies the application identifier of the application being displayed in the operation panel 113.

In step S1702, the control right management unit 211 determines whether the application identifier of the application that was identified in step S1701 is included in the application management table 700. If not included is determined (NO in step S1702), this processing flow terminates without updating the application management table 700. If included in the application management table 700 is determined (YES in step S1702), the processing proceeds to step S1703.

In step S1703, the control right management unit 211 refers to the application management table 700 to determine whether the application identified in step S1701 has a control right. If having a control right is determined (YES in step S1703), this processing flow terminates without updating the application management table 700. If it is determined that the application being displayed does not have a control right (NO in step S1703), the processing proceeds to step S1704.

In step S1704, the control right management unit 211 determines whether an application having a control right is present in the application management table 700. If it is determined that an application having a control right is not present (NO in step S1704), the processing proceeds to step S1710, and if it is determined that an application having a control right is present (YES in step S1704), the processing proceeds to step S1705.

In step S1705, the control right management unit 211 disables the control right of the application determined to have the control right in step S1704. In other words, the control right management unit 211 changes to "0" the value of the control right 702 of the application, in the application management table 700.

In step S1706, the control right management unit 211 determines whether USB devices controlled from the application (in other words, opened USB devices) are all USB devices that are included in the list of excepted devices 1500. If it is determined that all are included in the list of excepted devices 1500 (YES in step S1706), the processing proceeds to step S1710, and if it is determined that even one USB device not included in the list of excepted devices 1500 is opening (NO in step S1706), the processing proceeds to step S1707.

In step S1707, the control right management unit 211 performs closing processing for open USB devices not registered in the list of excepted devices 1500. That is, the control right management unit 211 performs forced closing processing with respect to open USB devices.

In step S1708, the event notification unit 210 refers to the application management table 700 to determine whether an event listener for the application determined in step S1704 is present. If it is determined that an event listener is not present (NO in step S1708), the processing proceeds to step S1710, and if it is determined that an event listener is present (YES in step S1708), the processing proceeds to step S1709.

In step S1709, the event notification unit 210 notifies a USB device connection number change event to the application for which a determination was made in step S1704.

In step S1710, the control right management unit 211 adds a control right to the displayed application that was identified in step S1701. In other words, the control right management unit 211 changes to "1" the value of the control right 702 of the application, in the application management table 700.

In step S1711, the control right management unit 211 determines whether closing processing was performed in step S1707. In other words, it is determined whether all open USB devices are excepted devices. If it is determined that closing processing was performed (YES in step S1711), processing proceeds to step S1712, and if it is determined that closing processing was not performed (NO in step S1711), this processing flow terminates.

In step S1712, the event notification unit 210 refers to the application management table 700 to determine whether an event listener for the application identified in step S1701 is present. If it is determined that an event listener is not present (NO in step S1712), this processing flow terminates, and if it is determined that an event listener is present (YES in step S1712) the processing proceeds to step S1713.

In step S1713, the event notification unit 210 notifies a USB device connection number change event to the event listener of the application identified in step S1701. This processing flow is then terminated.

Figure 18:
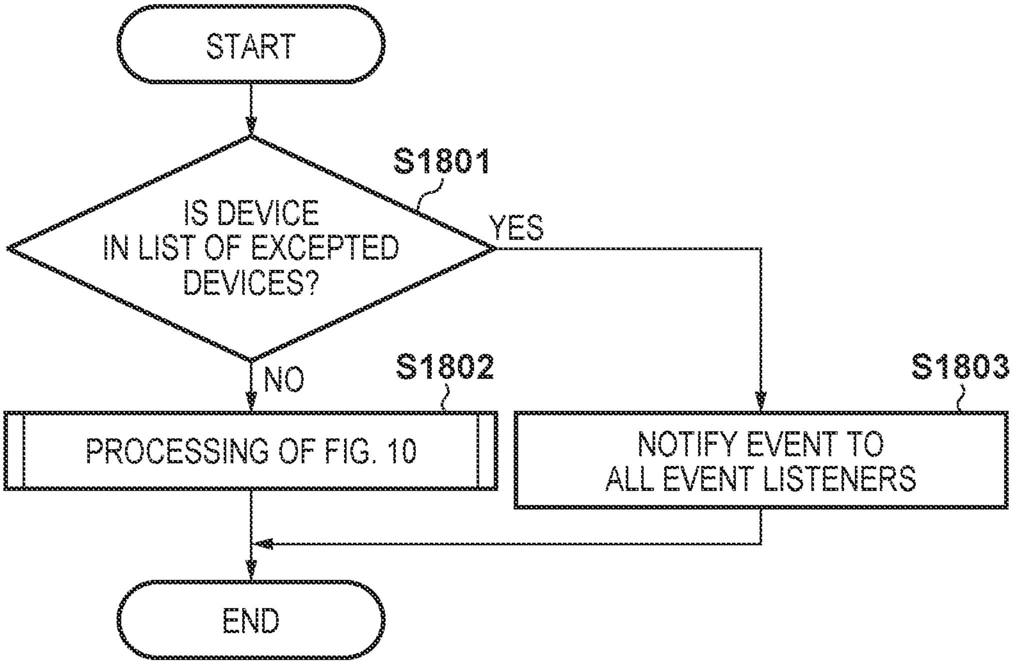
FIG. 18 depicts a flowchart for when there is a change of a number of connected USB devices according to the third embodiment.

FIG. 18 is a flowchart illustrating a processing flow when the USB control library 205 has detected a connection or removal of a USB device. Each procedure of the flowchart of FIG. 18 is executed by the event notification unit 210 inside the USB control library 205.

Upon detecting connection or removal of a USB device, in step S1801, the event notification unit 210 determines whether the USB device that was connected or removed is a USB device that is registered in the list of excepted devices 1500. If it is determined to be a USB device not registered in the list of excepted devices 1500 (NO in step S1801), the processing proceeds to step S1802, and if determined to be a registered USB device (YES in step S1801), the processing proceeds to step S1803.

In step S1802, the event notification unit 210 executes processing similar to as in the flowchart explained by FIG. 10. This processing flow is then terminated.

In step S1803, the event notification unit 210 notifies a USB device connection number change event to all event listeners registered in the application management table 700. This processing flow is then terminated.

Therefore, in the third embodiment, a list of excepted devices is held, and control is divided based on it. By this, it is possible to support a situation such as desiring to cause a particular USB device to be monopolized by an application. Note that, in the present embodiment, the list of excepted devices is configured to be embedded in the USB control library 205 in advance, but configuration may be taken such that a user can register a device in the list of excepted devices. In addition, configuration may be taken such that an application itself can register an excepted device.

In addition, an example in which each USB device was registered as an excepted device in the list of excepted devices was illustrated, but there is no limitation to this. For example, configuration may be taken to register only a vendor ID, and handle all USB device products for the vendor indicated by the vendor ID as excepted devices. In addition, configuration may be taken to newly provide an ID that indicates a product group, and handle USB devices belonging to that group as excepted devices.

In addition, in the above embodiment, all applications were assumed to have the same handling, but there is no limitation to this. For example, regarding a registered application that is registered in a list as an excepted application, configuration may be taken so that it is possible to monopolize a USB device even if a corresponding screen is not being displayed on the display panel, for example. In such a case, configuration may be taken such that a user can register the excepted application in the list, or configuration may be taken such that the application can register itself.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-171179, filed Aug. 31, 2015, which is hereby incorporated by reference herein in its entirety.

What is claimed is:

1. An information processing apparatus in which a plurality of applications operate, the apparatus comprising:

an identification unit configured to identify, from among the plurality of applications, an application that is being displayed in a display unit; and a control unit configured to perform control so that while one application among the plurality of applications is occupying a USB device USB-connected to the information processing apparatus, another application cannot use the USB device;

wherein the control unit performs control so as to forcibly close usage of the USB device by an application for which usage of the USB device is permitted, and permit usage of the USB device by the application identified as being displayed in the display unit.

2. The information processing apparatus according to claim 1, wherein when a request for usage of a USB device is received from an application, the control unit determines whether the application is permitted to use the USB device, and if not permitted makes it appear to the application as if the USB device is not USB-connected to the information processing apparatus.

3. The information processing apparatus according to claim 1, wherein, if an application is permitted to use the USB device, the control unit makes it appear to the application as if the USB device has been newly USB-connected to the information processing apparatus.

4. The information processing apparatus according to claim 1, wherein, if usage of a USB device by an application is forcibly closed, the control unit makes it appear as if a USB connection for the USB device has been released.

5. The information processing apparatus according to claim 1, further comprising a unit configured to provide a setting screen for setting an operation mode in the control unit, wherein if an operation mode for prioritizing an application for which a screen is displayed in the display unit is set in the setting screen, the control unit performs control for changing permission for usage of the USB device.

6. The information processing apparatus according to claim 1, further comprising a management unit configured to manage an excepted device as a non-target of control by the control unit, wherein control by the control unit with respect to a USB device managed as the excepted device by the management unit is not performed.

7. The information processing apparatus according to claim 6, wherein the management unit manages a USB device as the excepted device on a per-product or a per-vendor basis.

8. The information processing apparatus according to claim 1, further comprising a management unit configured to manage an excepted application as a non-target of control by the control unit, wherein control by the control unit with respect to an application managed as the excepted application by the management unit is not performed.

9. The information processing apparatus according to claim 1, wherein, if a USB device is USB-connected to the information processing apparatus or if the USB device is removed from the information processing apparatus, the control unit provides a corresponding notification to an application for which usage of the USB device is permitted.

10. The information processing apparatus according to claim 1, wherein the information processing apparatus can be connected to a plurality of USB devices, and the control unit controls permission of usage by an application with respect to each of the plurality of USB devices.

11. A method of controlling an information processing apparatus in which a plurality of applications operate, the method comprising:

identifying, from among the plurality of applications, an application that is being displayed in a display unit;

controlling so that while one application among the plurality of applications is occupying a USB device USB-connected to the information processing apparatus, another application cannot use the USB device; and controlling so as to forcibly close usage of the USB device by an application for which usage of the USB device is permitted, and permit usage of the USB device by the application identified as being displayed in the display unit.

12. A non-transitory computer-readable storage medium storing a computer program for causing a computer to function as an identification unit configured to identify, from among a plurality of applications, an application being displayed in a display unit; and a control unit configured to perform control so that while one application among the plurality of applications is occupying a USB device USB-connected to the computer, another application cannot use the USB device;

wherein the control unit performs control so as to forcibly close usage of the USB device by an application for which usage of the USB device is permitted, and permit usage of the USB device by the application identified as being displayed in the display unit.

* * * * *